United States Patent
Ahlbäck et al.

(10) Patent No.: US 11,139,957 B2
(45) Date of Patent: Oct. 5, 2021

(54) METHOD AND APPARATUS FOR CREATING A FINITE BLOCKCHAIN

(71) Applicant: Telefonaktiebolaget LM Ericsson (publ), Stockholm (SE)

(72) Inventors: Hans Ahlbäck, Åbo (FI); Harri Hakala, Turku (FI); Mikael Jaatinen, Raisio (FI); Leena Marjatta Mattila, Turku (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 16/466,119

(22) PCT Filed: Dec. 8, 2016

(86) PCT No.: PCT/EP2016/080255
§ 371 (c)(1),
(2) Date: Jun. 3, 2019

(87) PCT Pub. No.: WO2018/103850
PCT Pub. Date: Jun. 14, 2018

(65) Prior Publication Data
US 2020/0076576 A1   Mar. 5, 2020

(51) Int. Cl.
*H04L 29/06* (2006.01)
*H04L 9/06* (2006.01)
(Continued)

(52) U.S. Cl.
CPC ............ *H04L 9/0637* (2013.01); *G06F 21/64* (2013.01); *H04L 9/0643* (2013.01);
(Continued)

(58) Field of Classification Search
None
See application file for complete search history.

(56) References Cited

U.S. PATENT DOCUMENTS

| 5,121,495 A * | 6/1992 | Nemes ............... G06F 16/9014 |
| 7,487,272 B2 * | 2/2009 | Hickson ................. G06F 7/785 |
| | | 710/52 |

(Continued)

FOREIGN PATENT DOCUMENTS

| WO | WO 2017/006134 A1 | 1/2017 |
| WO | WO 2017/006136 A1 | 1/2017 |

OTHER PUBLICATIONS

International Search Report and Written Opinion of the International Searching Authority, PCT/EP2016/080255, dated Aug. 7, 2017, 14 pages.
(Continued)

*Primary Examiner* — Andrew J Steinle
*Assistant Examiner* — Hassan A Hussein
(74) *Attorney, Agent, or Firm* — Sage Patent Group (57) ABSTRACT

An apparatus and method for creating a finite blockchain is provided. The blockchain comprises a genesis block that is the first block of the blockchain. The genesis block comprising a genesis expiry time. The method comprises the steps of creating a reincarnation block when a predefined condition is satisfied and appending it to the blockchain; determining whether the genesis expiry time has elapsed based on an expiry period; if the genesis expiry time has elapsed then identifying a first reincarnation block; if the first reincarnation block is identified then deleting all the blocks preceding the first reincarnation block including the genesis block in the block chain.

19 Claims, 7 Drawing Sheets

(51) Int. Cl.
  *G06F 21/64* (2013.01)
  *H04L 9/32* (2006.01)
(52) U.S. Cl.
  CPC .......... *H04L 9/3239* (2013.01); *H04L 9/3297* (2013.01); *H04L 2209/38* (2013.01); *H04L 2209/56* (2013.01)

(56) References Cited

U.S. PATENT DOCUMENTS

| | | | | |
|---|---|---|---|---|
| 8,190,564 | B2* | 5/2012 | Pang | H04L 63/0428 707/610 |
| 8,966,200 | B1* | 2/2015 | Bushman | G06F 16/162 711/162 |
| 9,679,276 | B1* | 6/2017 | Cuende | H04L 9/3236 |
| 10,404,467 | B1* | 9/2019 | Winarski | H04L 9/3239 |
| 2016/0028552 | A1* | 1/2016 | Spanos | H04L 9/3236 713/178 |
| 2016/0191243 | A1* | 6/2016 | Manning | H04L 9/321 713/168 |
| 2016/0379212 | A1* | 12/2016 | Bowman | H04L 9/3239 705/71 |
| 2017/0116693 | A1* | 4/2017 | Rae | H04L 9/3236 |
| 2017/0193619 | A1* | 7/2017 | Rollins | G06Q 10/101 |
| 2017/0338957 | A1* | 11/2017 | Ateniese | H04L 9/0894 |
| 2018/0139278 | A1* | 5/2018 | Bathen | H04L 9/3236 |
| 2018/0337882 | A1* | 11/2018 | Li | H04L 9/3236 |
| 2019/0258971 | A1* | 8/2019 | Winarski | G06Q 10/063114 |
| 2020/0084022 | A1* | 3/2020 | Winarski | H04L 9/0894 |
| 2020/0322130 | A1* | 10/2020 | Rajagopal | H04L 61/2007 |
| 2021/0036858 | A1* | 2/2021 | Bruso | H04L 9/0643 |
| 2021/0058382 | A1* | 2/2021 | Shang | H04L 9/3239 |
| 2021/0073754 | A1* | 3/2021 | Lingala | G06Q 20/389 |
| 2021/0081402 | A1* | 3/2021 | Krishnan | G06F 16/2379 |
| 2021/0083850 | A1* | 3/2021 | Lingala | H04L 9/3239 |
| 2021/0090076 | A1* | 3/2021 | Wright | H04L 9/0637 |
| 2021/0226800 | A1* | 7/2021 | Cao | H04L 9/30 |

OTHER PUBLICATIONS

J.D. Bruce: "The mini-blockchain Scheme", Retrieved from the Internet: URL:http://eryotonite.info/files/mbc-scheme-rev2.pdf [retrieved on 2016-10-17] sections "The Acount Tree" and "The Mini-Blockchain" XP055311144, Jul. 31, 2014, 13 Pages.

Simple Machines Forum, Bitcoin Forum, "Proposal for self-pruning Blockchain", Retrieved from the Internet: https://bitcointalk.org/index.php?topic=913605.0 on Mar. 17, 2017, 10 Pages.

Alexey Eromenko "Technologov", "Proposal for self-pruning Blockchain", Jan. 4, 2015, 4 Pages.

Bitcoin Core, "Bitcoin Core version 0.11.0 released Jul. 12, 2015", 15 Pages.

* cited by examiner

FIG. 1

PRIOR ART

METHOD AND APPARATUS FOR CREATING A FINITE BLOCKCHAIN

This application is a 35 U.S.C. § 371 national stage application of PCT International Application No. PCT/EP2016/080255 filed on Dec. 8, 2016, the disclosure and content of which is incorporated by reference herein in its entirety.

TECHNICAL FIELD

The invention relates to blockchain technology. The invention relates to a method and an apparatus for creating finite blockchains.

BACKGROUND

Blockchain is a tamper-evident, distributed and decentralized linear, append-only data structure that maintains a continuously growing list of data records. The blockchain consists of blocks that hold time stamped batches of valid transactions. Each block includes the hash of the all preceding blocks, linking the blocks together. The linked blocks form a chain, with each additional block reinforcing the blocks before it. As data is stored across the network, the blockchain eliminates the risks that come with data being held centrally.

There is a huge development around blockchain technology. The features of blockchain technology, such as the distributed shared public ledger, chained blocks, digitally signed transactions and blockchains' integrity algorithm, are attractive characteristics for many business and industrial sectors, especially in the financial sector. On the other hand, current blockchains are not without their limitations and concerns.

Several blockchains exist serving different characteristics, types and use cases. Examples of different types of blockchains include Bitcoin, Litecoin Ethereum and Hyperledger. At present, the Bitcoin blockchain is the most well-known and most widely deployed implementation of blockchains.

Today, each blockchain is growing linearly with time in a radical manner, without any technique available to downsize it. In a few years, the blockchains could grow into a petabyte-size database due to the accelerating use of blockchain and rapidly increasing number of transactions, which in turn is critically affecting the decentralization, as not all participants might have sufficient storage capacity, for instance, for financial or technical reasons.

Some problems foreseen with current blockchain implementations include the need to allocate indefinite or non-restrictive computing power, disk space and connectivity for read operations to the blockchains.

SUMMARY

It is an object of the invention to address at least some of the limitations, problems and issues outlined above. More specifically, it is an object of the invention to provide a method and an apparatus for creating a finite blockchain.

These and other objects of the invention are achieved by means of different aspects of the invention, as defined by the independent claims. Embodiments of the invention are characterized by the dependent claims.

According to a first aspect of the invention, a method for creating a finite blockchain is provided. The blockchain comprises of a genesis block, wherein it is the first block of the block chain and the genesis block has a genesis expiry time defined in it. The method comprises the steps as stated. A reincarnation block is created whenever a predefined condition is satisfied and the created reincarnation block is appended to the blockchain. It is then determined whether the genesis expiry time has elapsed based on an expiry period. If the genesis expiry time has elapsed then a first reincarnation block is identified in the blockchain. After, the first reincarnation block is identified, and then all the blocks preceding the first reincarnation block including the genesis block in the block chain are deleted. The creation of reincarnation blocks in the blockchain enables to define expiry points for a blockchain. The deletion of the blocks from the blockchain enables applications (in which transactions have a certain validity time) to use this type of blockchain with more efficient storage and processing requirements.

The method may further comprise the step of identifying the first reincarnation block as the genesis block of the blockchain when all the blocks preceding the first reincarnation block including the genesis block are deleted.

The reincarnation block created may comprise a reincarnation block identifier for identifying the reincarnation block; a reincarnation expiry time wherein the reincarnation expiry time comprises the expiry time of all the blocks succeeding the reincarnation block up to a next reincarnation block; and a hash value of a preceding block for ensuring the integrity of the blockchain.

The hash value of a preceding block is the hash value taken over the header of the preceding block. This is done in order to preserve the integrity of the block chain, each block in the chain confirms the integrity of the previous one, all the way back to the first block in the block chain which is the genesis block.

The expiry period used for determining whether the genesis expiry time has elapsed is defined according to a user requirement or in accordance to the type of the blockchain for which it is implemented.

The predefined condition which needs to be satisfied for creating a reincarnation block can be defined as either determining whether a predefined number of blocks are appended to the block chain or whether a predefined timestamp value is reached. Further, the predefined number of blocks used for determining the number of blocks appended to the block chain is defined according to a user requirement or in accordance to the type of the blockchain for which it is implemented. The predefined timestamp value that may be used in the predefined condition which needs to be satisfied for creating a reincarnation block, can be is defined according to a user requirement or in accordance to the type of the blockchain for which it is implemented.

The genesis block which is created as the first block of the block chain may comprise a genesis expiry time, wherein the genesis expiry time comprises the expiry time of all the blocks succeeding the genesis block up to the first reincarnation block and a genesis block identifier for identifying the genesis block.

The first reincarnation block is the reincarnation block occurring first in sequence after the genesis block in the blockchain.

According to second aspect of the invention, an apparatus for creating a finite blockchain is provided. The apparatus comprises a processor and a computer memory storing a set of computer readable instructions. When the set of computer readable instructions are executed by the processor, the apparatus is operative to create a reincarnation block whenever a predefined condition is satisfied and the created reincarnation block is appended to the blockchain. It then determines whether the genesis expiry time has elapsed based on an expiry period. If the genesis expiry time has elapsed then identifies a first reincarnation block in the blockchain. After, the first reincarnation block is identified, and then deletes all the blocks preceding the first reincarnation block including the genesis block in the block chain.

The set of computer readable instructions may further configured to identify the first reincarnation block as the genesis block of the blockchain when all the blocks preceding the first reincarnation block including the genesis block are deleted.

According to third aspect of the invention, a computer program for creating a finite blockchain is provided. The computer program comprises of computer-executable instructions which when executed on the apparatus, causes the apparatus to create a reincarnation block whenever a predefined condition is satisfied and the created reincarnation block is appended to the blockchain. It then determines whether the genesis expiry time has elapsed based on an expiry period. If the genesis expiry time has elapsed then identifies a first reincarnation block in the blockchain. After, the first reincarnation block is identified, and then deletes all the blocks preceding the first reincarnation block including the genesis block in the block chain.

The apparatus may further by the execution of the computer-executable instructions caused to identify the first reincarnation block as the genesis block of the blockchain when all the blocks preceding the first reincarnation block including the genesis block are deleted.

According to fourth aspect of the invention a computer program product which is provided comprising an embodiment of a computer program according to the third aspect and a computer readable means on which the computer program is stored.

BRIEF DESCRIPTION OF THE DRAWINGS

The invention will now be described in more detail by means of some example embodiments and with reference to the accompanying drawings, in which.

DETAILED DESCRIPTION

The invention will now be described more fully hereinafter with reference to the accompanying drawings, in which certain embodiments of the invention are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 5:
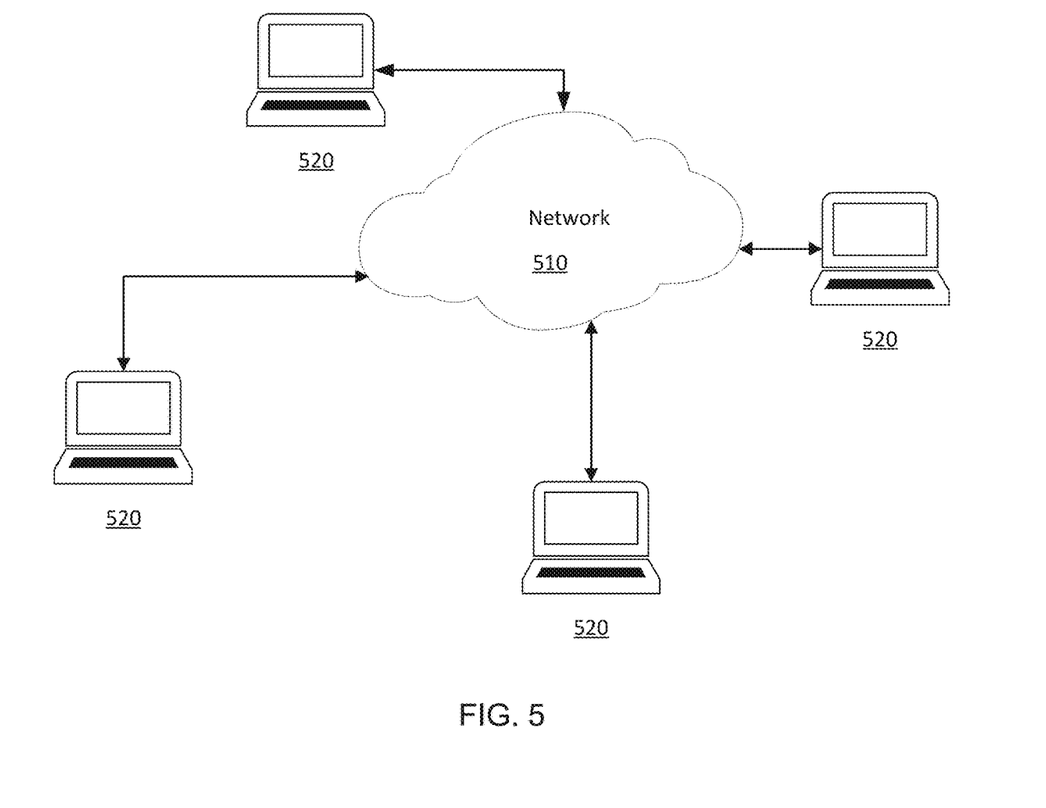
FIG. 5 is a schematic block diagram of an environment where the embodiments presented herein may be applied.

FIG. 5 shows a schematic block diagram of an environment where embodiments of the invention presented herein may be applied. The environment comprises computing systems 520. The computing systems 520 represented may be used by different validators or participants or users in a blockchain implementation and examples of computing systems include a laptop, computer, smartphone or server etc. The computing systems are connected optionally to each other via a network 510. The network 510 can be a local area network (LAN) or a wide area network (WAN) such as the Internet. The connection between the computing systems 520 and the network can be wireless or wire based. The wired connection can for example be a local area network connection such as an Ethernet connection, and/or a local connection such as a USB (Universal Serial Bus) connection or Fire Wire connection. The wired connection can also comprise a connection between a facility and an Internet service provider, e.g. using DSL (Digital Subscriber Line), coaxial cable (also used for cable television) and/or an optical fibre. All computing systems 520 in the network 510 have a copy of the blockchain, which they keep updated to the latest version across.

The environment shown in FIG. 5, is suitable for implementing and executing a finite blockchain as will be explained in more detail below.

Figure 1:
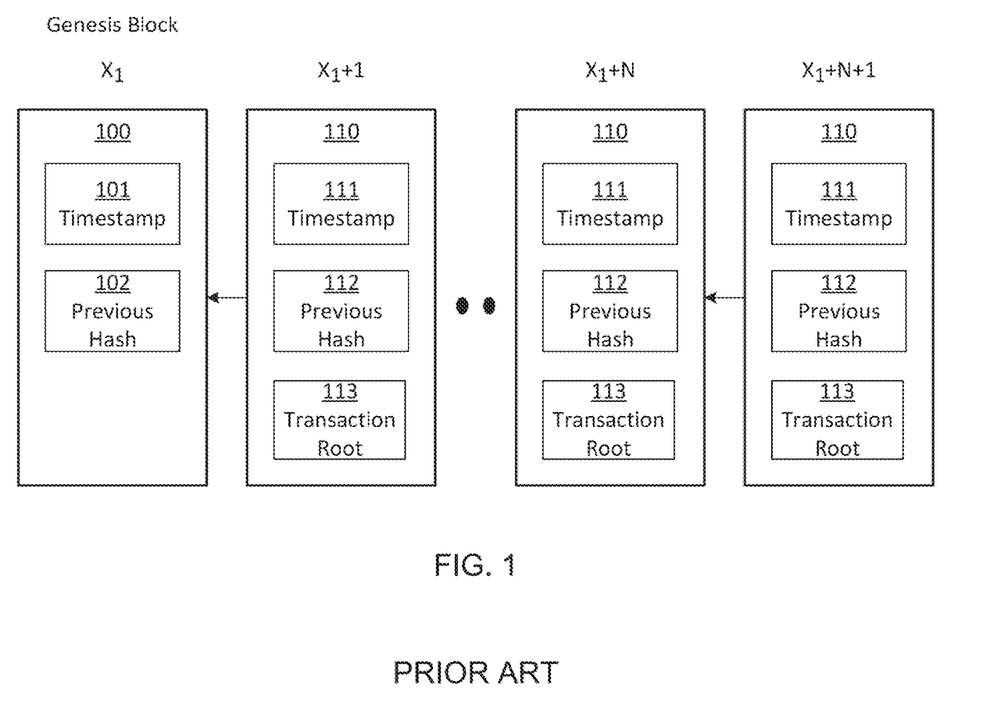
FIG. 1 is a schematic block diagram of an existing blockchain structure, in accordance to the prior-art.

In FIG. 1, a schematic block diagram of an existing blockchain structure according to prior art is shown; wherein the blockchain comprises a genesis block 100 and blocks 110. Blocks 110 will now be described. Blocks 110 may comprise timestamped single or batches of valid transactions. Each block 110 is appended to the blockchain in a sequential manner in the increasing order of the timestamp in which it is created and appended to the blockchain. Each block 110 includes timestamp 111, previous hash 112 and transaction root 113 details. The timestamp 111 comprises the timestamp value at which the block 110 was created and appended to the blockchain. The previous hash 112 of a block 110 contains the hash of the adjacent block 100/110 preceding it. The adjacent block can either be one of block 110 or the genesis block 100, whichever is the last block in the blockchain to which said block is appended to. The previous hash 112 of a block 110 allows for linking the blocks together. The previous hash 112 of a block 110 enables in identifying and creating an association with the blocks preceding the block 110. The linked blocks 100/110 form a chain, with each additional block 110 reinforcing those before it. The transaction root 113 comprises the hash of the Transaction header root for all the transactions associated with the block 110.

Generally in the blockchain technology, the very first block of the blockchain is known as a genesis block 100. The genesis block 100 denotes the starting of a blockchain. The genesis block 100 comprises of a timestamp 101 which comprises a timestamp value at which the genesis block 100 was created. The genesis block 100 further comprises a previous hash 102. The previous hash 102 of the genesis block 100 has a null value as there is no block preceding the genesis block 100.

Generally in the different types of blockchain discussed in the background section, blocks 110 are appended to the blockchain indefinitely in a sequential manner. Currently, there is no option available for deleting the blocks 110 in which the transactions have expired, elapsed or become invalid. Therefore, the amount of data stored in a blockchain increases linearly with time as old transaction data can never be removed from the blockchain. In existing blockchains deleting the blocks 110 that are outdated and no longer needed, is not possible. Therefore, at present a blockchain cannot be broken or divided at certain predefined block intervals as it would affect the linking/linkage of the blockchain in terms of its integrity and cryptographic strength. Each block 110 of the blockchain, except the genesis block 200, includes the hash of the previous block, so it is not possible to modify the previous blocks 110 in the blockchain after they have been added, therefore it enables in maintaining integrity and cryptographic strength of the blockchain. Therefore, in existing blockchains as shown in FIG. 1 the blocks 110 once added to the blockchain are permanently stored in the blockchain.

Figure 2A:
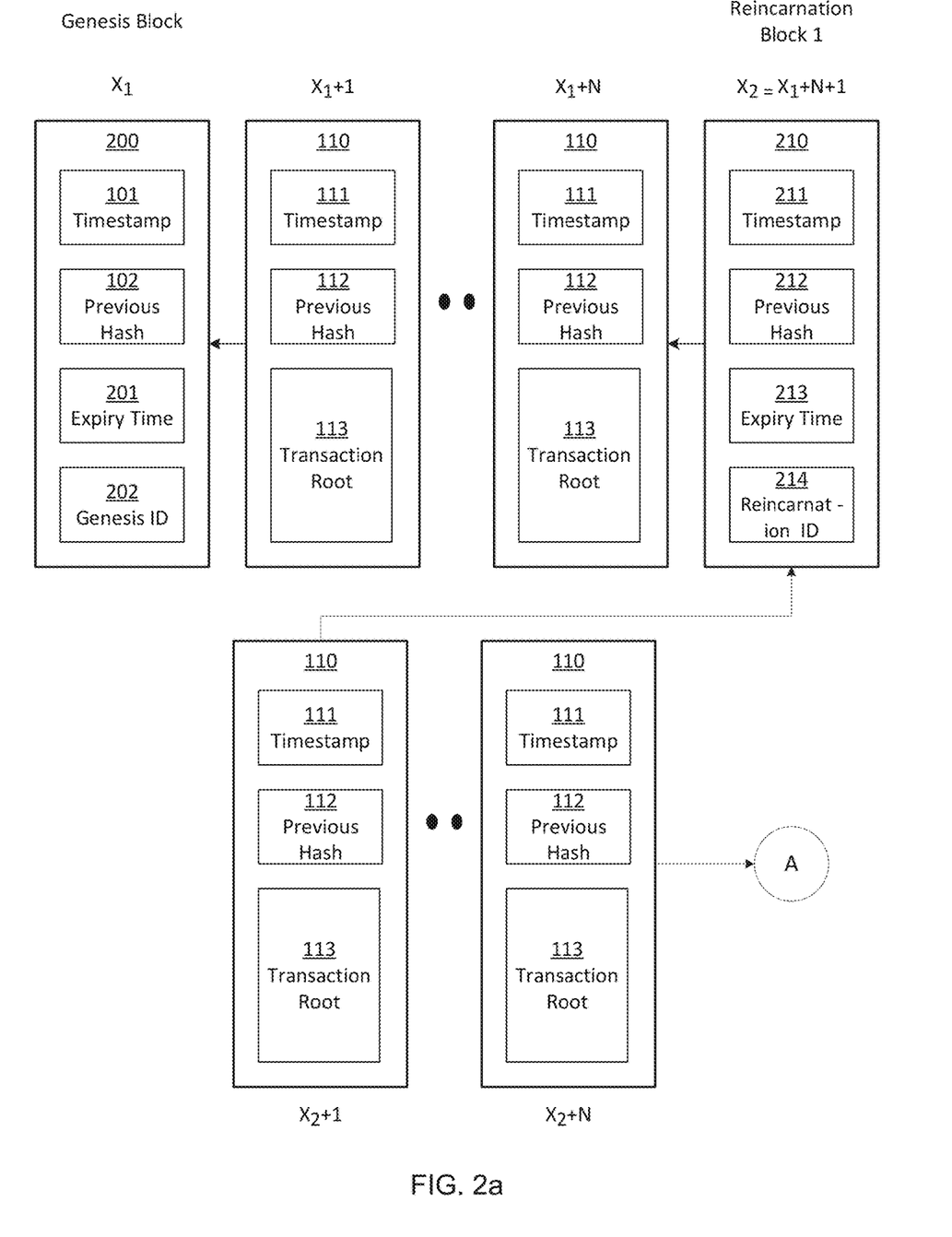
FIG. 2a and FIG. 2b is a schematic block diagram of a finite blockchain structure, in accordance to an embodiment of the invention.
Figure 2B:
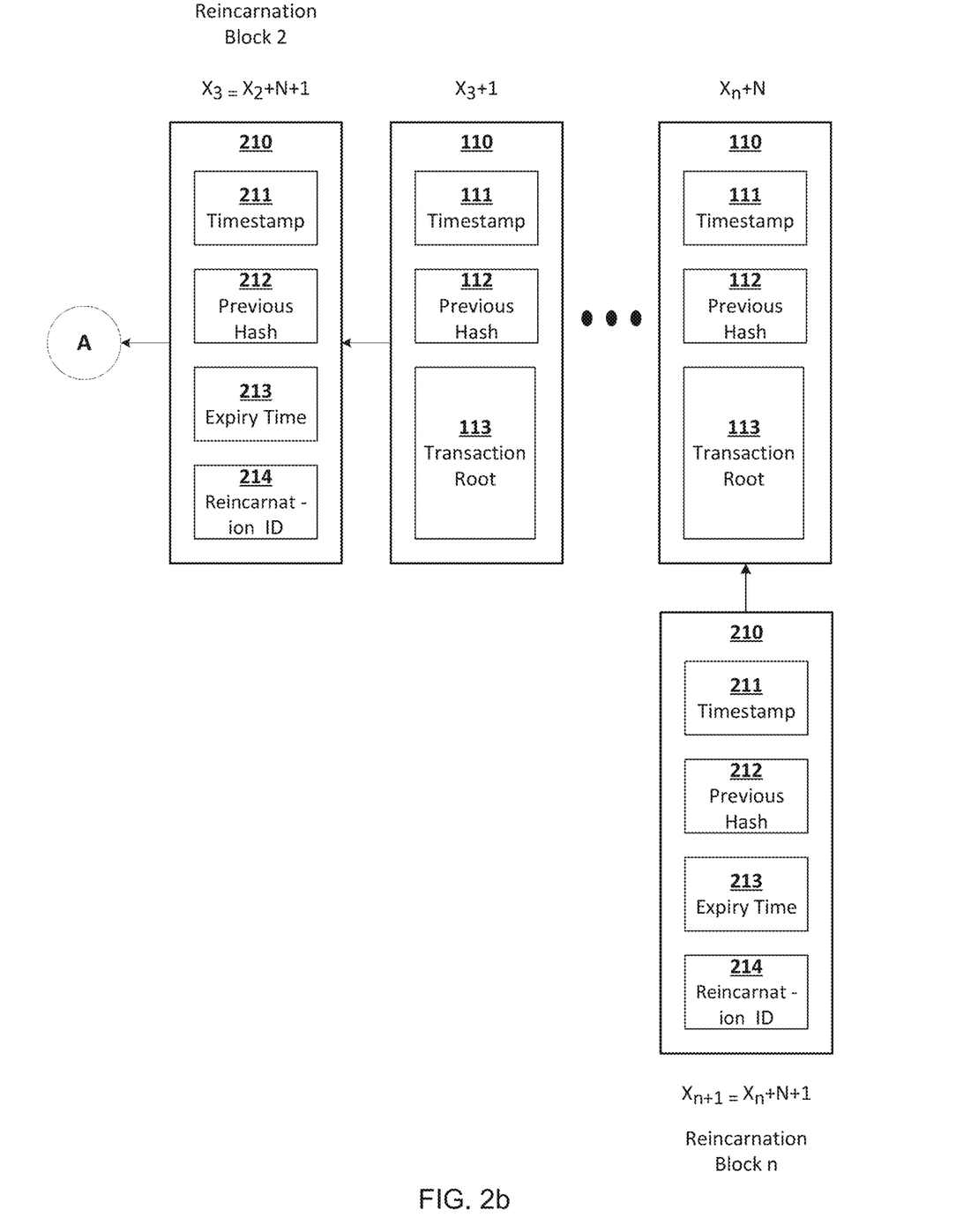

In FIG. 2a and FIG. 2b, a schematic block diagram of a finite blockchain structure in accordance with an embodiment of the present invention is shown. An object of this embodiment is to introduce a finite blockchain that can be broken or divided at certain predefined intervals. It enables the introduction of predefined breakpoints or expiry points in the blockchain. A new block type referred to as a reincarnation block 210 is introduced into the blockchain so as to create a finite blockchain. This enables parts of the blockchain to be pruned or deleted without breaking the consistency or continuity of the blockchain. The reincarnation blocks 210 are created and appended to the blockchain whenever breakpoints or expiry points are to be added to the blockchain. There could be several breakpoints or expiry points in the blockchain, and so more than one reincarnation blocks 210 could be inserted into the blockchain based on the blockchain requirement. The invention enables deletion or pruning of old data from the blockchains stored in the computer systems, thus, ensures in retaining the blockchain consistency or continuity for the newer data in the computer systems.

The old blockchain blocks 110 and transactions, preceding the first reincarnation block 210 in the blockchain will be deleted based on the expiry time defined in the genesis block 200 of the blockchain, thus enabling re-allocation of disk space. A reincarnation block 210 added at the breakpoints or expiry points in the blockchain indicate the new start of the remaining blockchain. The support or availability of a dedicated blockchain is thus limited in time, meaning that once the expiry time defined in the genesis block 200 of the blockchain have elapsed then all the blocks preceding the reincarnation block 210 are removed from the blockchain and cannot be used for further verification. Therefore, embodiments of the invention enable the removal of blocks 110 and their associated transactions that are outdated.

As in the known blockchain structure described with reference to FIG. 1, the very first block of the finite blockchain is called a genesis block 100. The genesis block 200 of the finite blockchain according to embodiments of the present invention and as shown in FIG. 2a may comprise a timestamp 101, a previous hash 102, a genesis expiry time 201 and a genesis id 202. The timestamp 101 comprises a timestamp value at which the genesis block 200 was created. The previous hash 102 of the genesis block 200 has a null value as there is no block preceding the genesis block 200. The genesis expiry time 201 comprises the expiry time value for all the blocks 110 succeeding the genesis block 200 up to the first reincarnation block 210 in the blockchain. The genesis id 202 may comprise an identifier value for identifying the genesis block 200 in the blockchain. For example, the genesis id 202 could be a user defined variable value set to 'G' or '01' etc. based on the blockchain requirements.

Referring again to FIG. 2a and FIG. 2b, the reincarnation block 210 of the finite blockchain comprises a timestamp 211, a previous hash 212, a reincarnation expiry time 213 and a reincarnation id 214. The timestamp 211 comprises a timestamp value at which the reincarnation block 210 was created and appended to the blockchain. The previous hash 102 of the reincarnation block 210 contains the hash of the adjacent block 110 preceding the reincarnation block 210. (that is the block 110 that was appended just prior to the reincarnation block 210 in the blockchain) The previous hash 102 ensures the integrity of the blockchain that is the continuity of the linking of the sequential blocks is maintained. The reincarnation expiry time 213 comprises an expiry time of all the blocks succeeding the reincarnation block 210 up to a next reincarnation block 210 (next breakpoint or expiry point of the blockchain). The reincarnation expiry time 213 value is defined based on user requirements, requirements of the type of the blockchain (such as Bitcoin, Litecoin Ethereum, Hyperledger etc.) and the value may vary from a few weeks to several decades. The reincarnation id 214 may comprise an identifier value for identifying the reincarnation block 210 in the blockchain. For example, the reincarnation id 214 could be a user defined variable value set to 'R' or '02' etc. based on the blockchain requirements.

Figure 3:
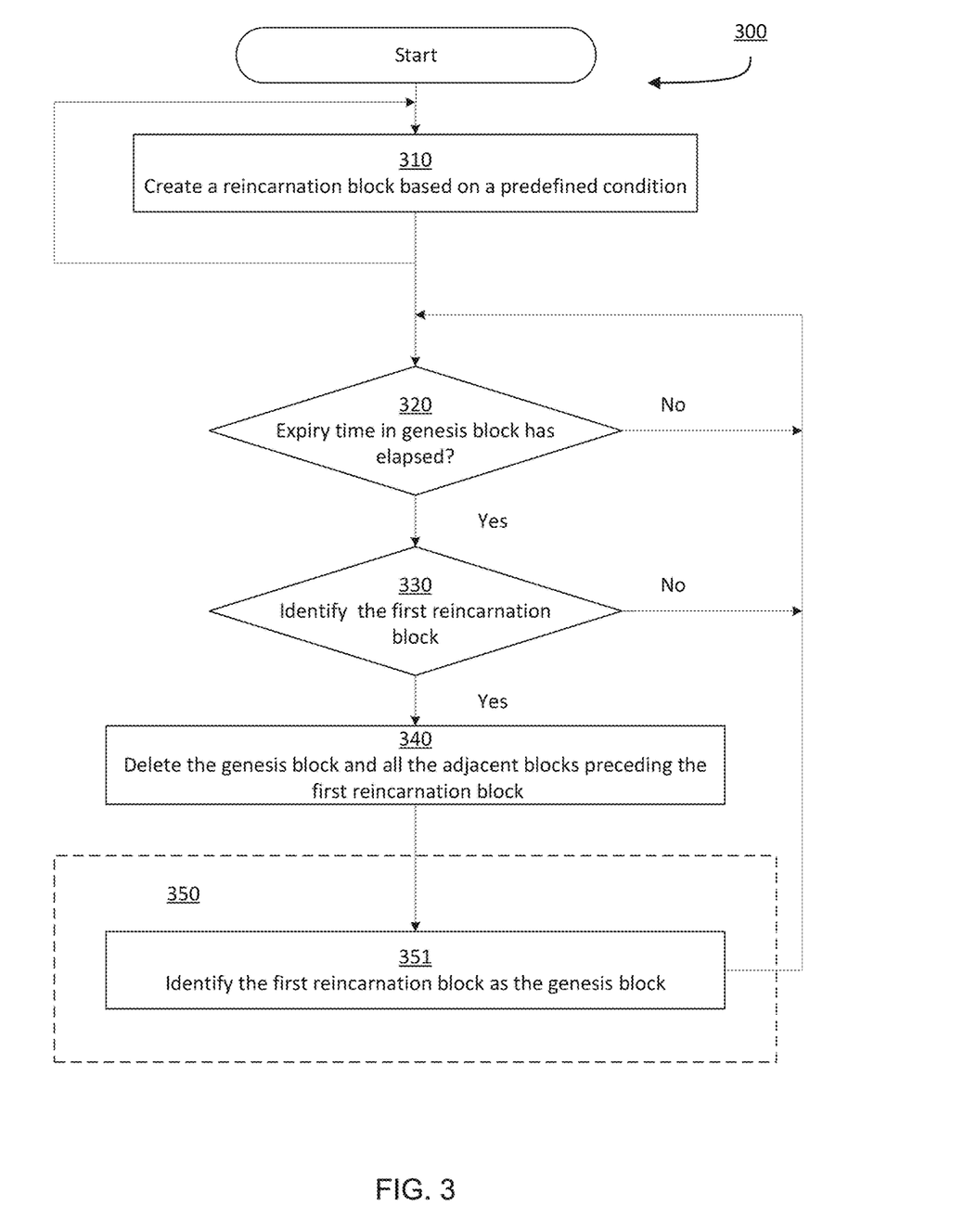
FIG. 3 is a schematic flowchart of a method for creating a finite blockchain, in accordance to an embodiment of the invention.

In FIG. 3, a schematic flowchart of a method 300 for creating a finite blockchain is illustrated. The method 300 implements the genesis block 200, reincarnation block 210 and blocks 110 described above with reference to FIG. 2a and FIG. 2b.

The method in FIG. 3 comprises the steps of creating a reincarnation block 210 whenever a predefined condition is satisfied and appending it to the blockchain, step 310. The method further comprises determining whether the genesis expiry time 201 has elapsed based on an expiry period, step 320. If the genesis expiry time 201 has elapsed then the method comprises identifying a first reincarnation block 210, wherein the first reincarnation block 210 is occurring first in sequence after the genesis block 200 in the blockchain, step 330. If the first reincarnation block 210 is identified then the method comprises deleting all the blocks 110 preceding the first reincarnation block 210 including the genesis block 200 in the block chain 340. The method may further comprise the step of identifying the first reincarnation block 210 as the genesis block 200 of the blockchain when all the blocks 110 preceding the first reincarnation block 210 including the genesis block 200 have been deleted 351. In FIG. 3, this step is shown in dashed lines so as to indicate that this step is optional.

Main steps of the method shown in FIG. 3 may be summarized to include; to create reincarnation blocks 210 in a blockchain based on a predefined condition, delete all the blocks 110 preceding the first reincarnation block 210 including the genesis block 200 in the block chain if the genesis expiry time 201 in the genesis block 200 has elapsed and there is at least one reincarnation block 210 present in the blockchain. After deletion, the first reincarnation block 210 is identified as the new genesis block of the blockchain.

In the finite blockchain (with reference to FIG. 2a and FIG. 2b) the genesis block 200 is the first block created in the blockchain. As described above, the genesis block 200 created in the finite blockchain comprises a timestamp 101, previous hash 102, genesis expiry time 201 and genesis id 202. The blocks 110 containing data and transactions details are created and appended to the finite blockchain after the genesis block 200 in a sequential manner in the ascending order of the timestamp value at which the blocks are appended to the finite blockchain.

Each step of the method 300 shown in FIG. 3 will now be discussed in more detail.

The create reincarnation block step 310 of FIG. 3, is based on a predefined condition, if this condition is satisfied then a new reincarnation block 210 is created and appended to the blockchain. The step of checking the predefined condition for creating a reincarnation block is an independent step which is performed iteratively. The predefined condition for creating a reincarnation block 210 is may be defined as either determining whether:

a predefined number of blocks 110 are appended to the blockchain, or, a predefined timestamp value is reached.

The predefined condition of a predefined number of blocks being appended to the blockchain means every time after a certain number of blocks 110 are appended to the blockchain, and when this condition is satisfied a new reincarnation block 210 is created and appended to the blockchain. The predefined number of blocks 110 may be defined based on user requirements, requirements of the type of the blockchain etc. (such as Bitcoin, Litecoin Ethereum, Hyperledger etc.). For example, if the predefined number of blocks 110 is predefined as '1000', then in the blockchain after every time 1000 blocks have been appended a new reincarnation block 210 is created and appended to the blockchain.

In the alternative predefined condition of a predefined timestamp value being reached can be described as every time after a certain timestamp value is reached a new reincarnation block 210 is created and appended to the blockchain. The predefined timestamp value may be defined on user requirements, requirements of the type of the blockchain etc. (such as Bitcoin, Litecoin Ethereum, Hyperledger etc.). For example, if the predefined timestamp is defined as '12:00 am UTC, every Sunday', then at 12:00 am UTC on every Sunday a new reincarnation block 210 is created and appended to the blockchain. The predefined timestamp value may be defined as significantly smaller than the genesis expiry time 201 and reincarnation expiry time 213.

The embodiments of the present invention are not limited to the two conditions described above for creating a new reincarnation block 210. For example, it should be understood that there could be further conditions based on user requirements, requirements of the type of the blockchain etc. (such as Bitcoin, Litecoin Ethereum, Hyperledger etc.). The predefined conditions can be implemented as predefined triggers and a new reincarnation block 210 is created when the predefined triggers have been reached.

The predefined conditions or triggers defined for creating a reincarnation block 210 in a finite blockchain are made available to all the validators, participants or users using the computing systems 520 (as shown in FIG. 5) having access to the blockchain. Thus, there is no need for a central control across all the validators, participants or users of a blockchain according to embodiments of the present invention for maintaining the integrity and consistency of the blockchain. For example, at present in Bitcoin the mining award is known to all users or validators (miners), and the mining award will have every 210,000 blocks. Similarly, each participant or user in the blockchain of the present invention will be aware of the predefined conditions or triggers for creating a reincarnation block 210, which could be executed automatically or manually accordingly.

When a new reincarnation block 210 is created and appended to the finite blockchain, then it will be validated and confirmed using the normal validation rules of the blockchain. At creation of the reincarnation block 210 there might be several instances in parallel (forking) but this will be resolved by the blockchain's standard validation rules. For example, in Bitcoin type of blockchains, the reincarnation block could be considered valid if there are at least 6 confirmed blocks after it.

The reincarnation block 210 created and appended to the finite blockchain, as described above, comprises of timestamp 211, previous hash 212, reincarnation expiry time 213 and reincarnation id 214.

In the expiry time in genesis block has elapsed step 320 of the method 300, it is determined whether the genesis expiry time 201 in the in genesis block 200 has elapsed based on an expiry period. If the genesis expiry time 201 has not elapsed then step 320 is continuously repeated such that it is again determined whether the genesis expiry time 201 has elapsed. The expiry period value for checking against the genesis expiry time 201 may be defined based on user requirements, the type of blockchain implementation, etc. For example, if the expiry period is defined as 'current timestamp value' and the genesis expiry time is defined as '12:00 am UTC, 14-November-2016' then the genesis expiry time would elapse when the expiry period becomes equal to '12:00 am UTC, 14-November-2016'.

If the genesis expiry time 201 has elapsed then the Identify the first reincarnation block step 330 of the method 300 is performed, wherein the first reincarnation block 210 which is occurring first in sequence after the genesis block 200 in the blockchain is identified. If a first reincarnation block 210 is not present or identified in the blockchain then step 320 of Expiry time in genesis block has elapsed is repeated. Thus, in order for the method to progress to the next step 340 at least one reincarnation block 210 should be present in the blockchain.

If the first reincarnation block 210 is identified in step 330, then the Delete the genesis block and all the adjacent blocks preceding the first reincarnation block step 340 is performed wherein all the blocks 110 preceding the first reincarnation block 210 including the genesis block 200 (which constitutes the elapsed or invalid blocks) in the blockchain are deleted. Hereinafter, the deleted blocks are referred as elapsed blocks. The deletion of the elapsed blocks from the blockchain can be implemented as predefined triggers for deleting the elapsed blocks.

After deleting the elapsed blocks, the Identify the first reincarnation block as the genesis block step 351 is performed wherein the first reincarnation block 210, which is now the first block of the finite blockchain, may be identified as the new genesis block 200 of the blockchain.

The predefined triggers for deleting all the elapsed blocks 200, 110 in a finite blockchain are made available to all the validators, participants or users using the computing systems 520 (as shown in FIG. 5) having access to the blockchain. Therefore, the deletion of the elapsed blocks will be executed uniformly across all the computing systems 520 of all the validators, participants or users who have access to the blockchain. Thus, there is no need for a central control across all the validators or participants or users of a blockchain for maintaining the integrity and consistency of the blockchain.

The information regarding the first reincarnation block 210, identified as the new genesis block 200 of the blockchain can be made known to all the validators, participants or users using the computing systems 520 (as shown in FIG. 5) having access to the blockchain. The details are made known, so that it enables anyone accessing the blockchain has the information that which reincarnation block 210 is identified as the genesis block 200 of the blockchain. The information regarding the new genesis block 200 of the blockchain may be provided validators, participants or users using the computing systems 520 (as shown in FIG. 5) having access to the blockchain through different types of communication medium such as email, social media (for example twitter, private groups etc.).

Figure 6A:
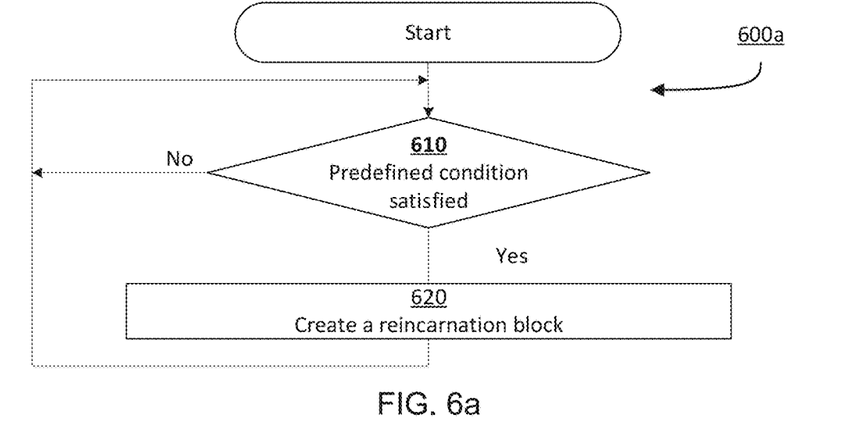
FIG. 6a is a schematic flowchart of a method for creating reincarnation blocks in a finite blockchain, in accordance to an embodiment of the invention.

In FIG. 6a, a schematic flowchart of a method 600a for creating a reincarnation block in a finite blockchain is illustrated. The method 600a comprises the step of determining whether the predefined condition for creating reincarnation block 210 is satisfied, step 610. If the predefined condition is satisfied then the method further comprises the step of creating a reincarnation block 210 and appending it to the blockchain, step 620. It should be understood that the method 600a is for creating a reincarnation block that has similar features to the reincarnation block described with reference to FIG. 2a and FIG. 2b.

Figure 6B:
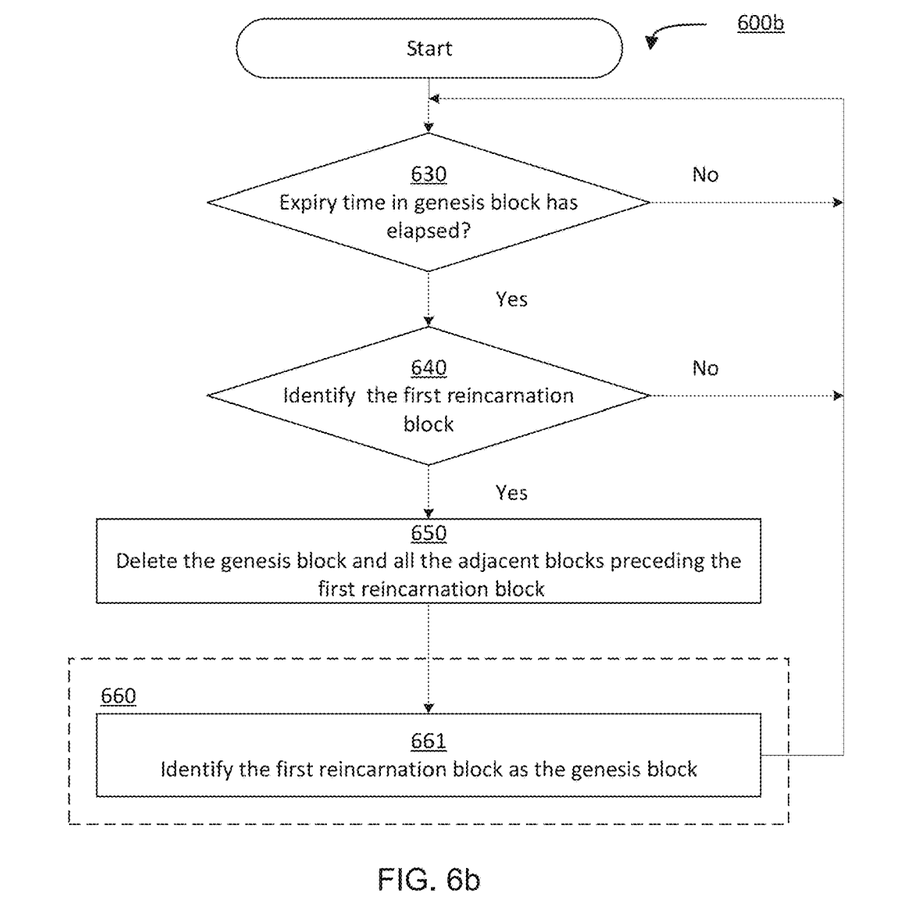
FIG. 6b is a schematic flowchart of a method for deleting blocks in a finite blockchain based on an expiry time in the genesis block, in accordance to an embodiment of the invention.

In FIG. 6b, a schematic flowchart of a method 600b for deleting blocks in a finite blockchain based on an expiry time in the genesis block is illustrated. The method comprises the step of determining whether the genesis expiry time 201 has elapsed based on an expiry period, step 630. If the genesis expiry time 201 has elapsed then the method further comprises identifying a first reincarnation block 210, wherein the first reincarnation block 210 is occurring first in sequence after the genesis block 200 in the blockchain, step 640. If the first reincarnation block 210 is identified then the method comprises the step of deleting all the blocks 110 preceding the first reincarnation block 210 including the genesis block 200 in the block chain, step 650. The method may further comprise the step of identifying the first reincarnation block 210 as the genesis block 200 of the blockchain when all the blocks 110 preceding the first reincarnation block 210 including the genesis block 200 are deleted, step 661. This step is shown in dashed lines in FIG. 6b so as to indicate that this step is optional.

Referring again to FIG. 2a and FIG. 2b, an example of an implementation of the above methods 300, 600a, 600b will now be described. The block $X_1$ is the genesis block which is the first block created in the finite blockchain. The blocks $X_{1+}1$ to $X_{1+}N$ are appended to the blockchain in a sequential manner in the increasing order of the timestamp in which it is created and appended to the finite blockchain.

In the illustrated finite blockchain of FIG. 2a and FIG. 2b, the predefined condition defined for creating a reincarnation block, as discussed above in connection with method 300, is when a predefined number of blocks are appended to the blockchain. The predefined number is defined as 'N', so in the blockchain after every time 'N' number of blocks are appended, a new reincarnation block ($X_2, X_3, \ldots X_{n+1}$, etc.) are created and appended to the blockchain.

The genesis expiry time of the genesis block $X_1$, stores the expiry time value for all the blocks $X_{1+}1$ to $X_{1+}N$ succeeding the genesis block $X_1$, up to the first reincarnation block $X_2$, occurring in the blockchain. The reincarnation expiry time of the reincarnation block $X_2$, stores the expiry time value of all the blocks $X_{2+}1$ to $X_{2+}N$ succeeding the reincarnation block $X_2$, up to a next reincarnation block $X_3$, which is occurring first in sequence after the reincarnation block $X_2$ in the blockchain. Similarly, the reincarnation expiry time of the reincarnation block $X_3$, stores the expiry time value of all the blocks $X_{3+}1$ to $X_{3+}N$ succeeding the reincarnation block $X_3$, up to a next reincarnation block $X_4$, which is occurring first in sequence after the reincarnation block $X_3$ in the blockchain and so on.

For determining whether the genesis expiry time of the genesis block $X_1$ has elapsed based on an expiry period, let us consider the expiry period is defined as 'current timestamp value' and the genesis expiry time of the genesis block $X_1$, is defined as '12:00 am UTC, 14-November-2016'. It is then determined whether the genesis expiry time of the genesis block $X_1$ has elapsed, that is when the expiry period (i.e. the current timestamp value) becomes equal to '12:00 am UTC, 14-November-2016'. When the genesis expiry time of the genesis block $X_1$ has elapsed then the first reincarnation block occurring in the finite blockchain is identified. In the illustrated finite blockchain, the first reincarnation block $X_2$ is identified. After identifying the First reincarnation block $X_2$, all the blocks $X_1+1$ to $X_1+N$ preceding the first reincarnation block $X_2$ including the genesis block $X_1$ are deleted from the blockchain. After the deletion, the first reincarnation block $X_2$ is identified as the new genesis block of the finite blockchain.

Figure 4:
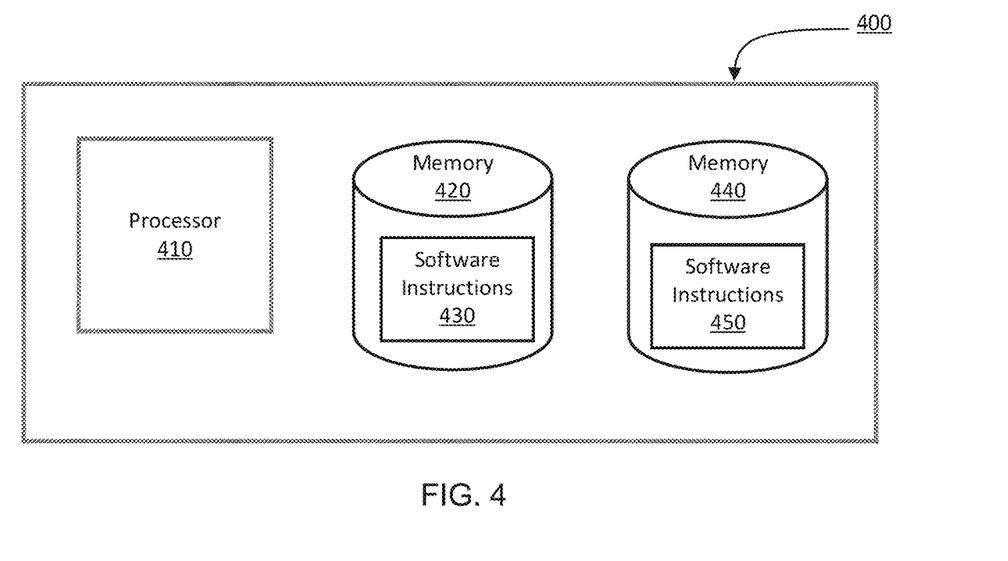
FIG. 4 is a schematic block diagram of the components of an apparatus for creating a finite blockchain, in accordance to an embodiment of the invention.
Figure 7:
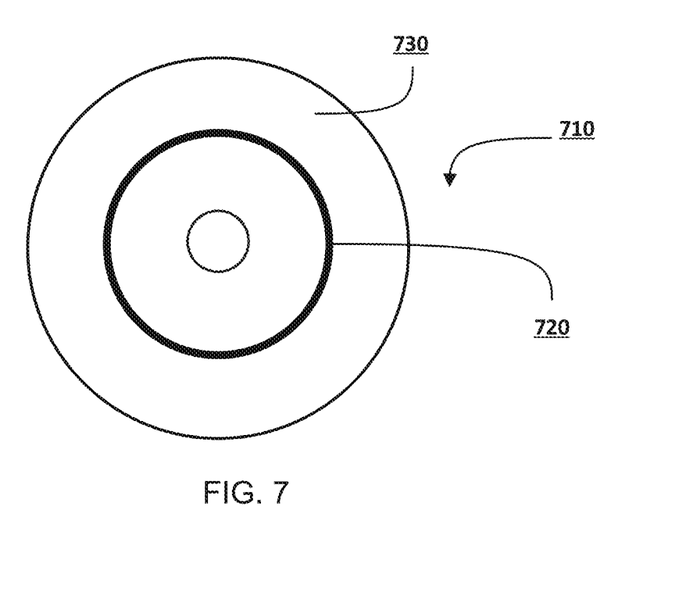
FIG. 7 is a schematic illustration of an embodiment of a computer program product in accordance with the present invention.

In FIG. 4, a schematic block diagram of an apparatus for creating a finite blockchain is illustrated. The apparatus 400 may execute methods 300, 600a, 600b of the present invention on receipt of suitable instructions from computer program 720. The apparatus 400 comprises a processor 410 configured to use any combination of one or more of a suitable central processing unit (CPU), multiprocessor, microcontroller, digital signal processor (DSP), application specific integrated circuit etc., capable of executing computer readable software instructions 430 stored in a memory 420. The memory 420 can thus be considered to be or form part of the computer program product 710.

The memory 420 may be any combination of read and write memory (RAM) and read only memory (ROM). The memory 420 may also comprise persistent storage, which, for example, can be any single one or combination of magnetic memory, optical memory, solid state memory or even remotely mounted memory.

A data memory 440 may also be provided, e.g. for reading and/or storing data during execution of software instructions in the processor 410. The data memory 440 can be any combination of read and write memory (RAM) and read only memory (ROM) and may also comprise persistent storage, which, for example, can be any single one or combination of magnetic memory, optical memory, solid state memory or even remotely mounted memory. The data memory 440 may e.g. hold other computer readable software instructions 450, to improve functionality for the apparatus illustrated in FIG. 4.

In FIG. 7, a schematic illustration of an embodiment of a computer program product is illustrated It shows one example of a computer program product 710 comprising computer readable storage medium 730. On this computer readable storage medium 730, a computer program 720 can be stored, which computer program 720 can cause the processor 410 and thereto operatively coupled entities and devices, such as the memory 420, 440, to execute methods according to the invention described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

Figure 8:
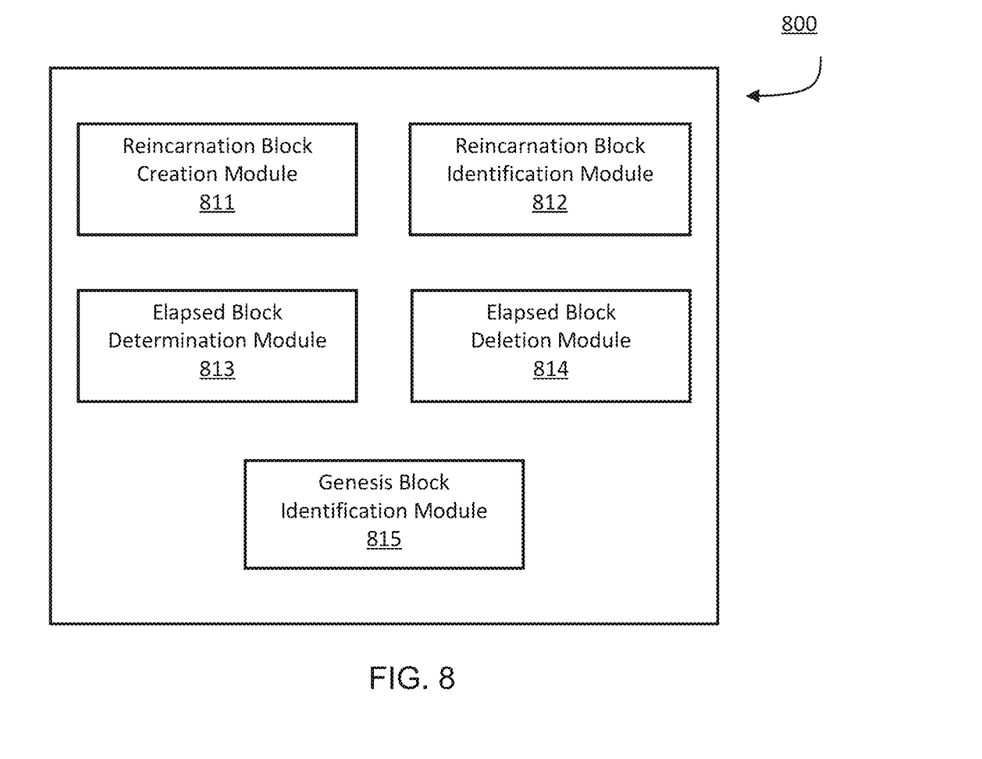
FIG. 8 is another schematic block diagram of the components of an apparatus for creating a finite blockchain, in accordance to an embodiment of the invention.

In FIG. 8, another schematic block diagram of an embodiment of an apparatus for creating a finite blockchain is illustrated. The apparatus 800 may execute methods 300, 600a, 600b, for example, according to computer readable instructions received from a computer program. It will be understood that the modules illustrated in FIG. 8 are software implemented functional units or modules, and may be realized in any appropriate combination of software modules.

Referring to FIG. 8, the apparatus 800 comprises a reincarnation block creation module 811 for creating a reincarnation block 210 whenever a predefined condition is satisfied and the created reincarnation block 210 is appended to the blockchain. The apparatus 800 further comprises an elapsed block determination module 813 for determining whether the genesis expiry time has elapsed based on an expiry period. The apparatus 800 further comprises a reincarnation block identification module 812 for identifying a first reincarnation block 210 in the blockchain, when the genesis expiry time has elapsed. The apparatus 800 further comprises an elapsed block deletion module 814 for deleting all the blocks preceding the first reincarnation block 210 including the genesis block 200 in the block chain, after the first reincarnation block 210 is identified by the reincarnation block identification module 812.

The apparatus 800 further comprises a genesis block identification module for identifying the first reincarnation block 210 as the genesis block 200 of the blockchain, when all the blocks preceding the first reincarnation block 210 including the genesis block is deleted by the elapsed block deletion module 814.

A reincarnation block created by the reincarnation block creation module 811 may comprise a reincarnation block identifier for identifying the reincarnation block; a reincarnation expiry time wherein the reincarnation expiry time comprises the expiry time of all the blocks succeeding the reincarnation block up to a next reincarnation block; and a hash value of a preceding block for ensuring the integrity of the blockchain.

As mentioned above, the apparatus comprises an elapsed block determination module 813 for determining whether the genesis expiry time has elapsed based on an expiry period. The expiry period may be defined according to a user requirement or in accordance to the type of the blockchain.

The predefined condition for creating a reincarnation block may be defined as either determining whether a predefined number of blocks are appended to the block chain or determining whether a predefined timestamp value is reached.

The predefined number of blocks may be defined according to a user requirement or in accordance to the type of the blockchain.

The predefined timestamp value may be defined according to a user requirement or in accordance to the type of the blockchain.

The apparatus may further comprise a genesis block creation module for, as a preliminary step, creating the genesis block of the blockchain with a genesis expiry time, wherein the genesis expiry time comprises the expiry time of all the blocks succeeding the genesis block up to the first reincarnation block; and a genesis block identifier for identifying the genesis block.

The first reincarnation block may be the reincarnation block occurring first in sequence after the genesis block in the blockchain.

The invention has mainly been described above with reference to a few embodiments. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

The invention claimed is:

1. A method for creating a finite blockchain, the blockchain comprising a genesis block having a genesis expiry time, wherein the genesis block is a first block of the blockchain, the method comprising:
   creating a reincarnation block based on a predefined condition, and appending the reincarnation block to the blockchain that comprised the genesis block, wherein the reincarnation block comprises a reincarnation expiry time different than the genesis expiry time and comprises a hash value of a preceding block of the blockchain;
   determining whether the genesis expiry time has elapsed based on an expiry period;
   responsive to when the genesis expiry time has elapsed, then identifying a first reincarnation block; and
   responsive to when the first reincarnation block is identified, then deleting all the blocks preceding the first reincarnation block including the genesis block in the block chain.

2. The method of claim 1, further comprising, identifying the first reincarnation block as the genesis block.

3. The method of claim 1, wherein the reincarnation block comprises:
   a reincarnation block identifier for identifying the reincarnation block, and
   the reincarnation expiry time is based on an expiry time of all the blocks succeeding the reincarnation block up to a next reincarnation block.

4. The method according to claim 1, wherein the expiry period is defined according to a user requirement or in accordance to a type of the blockchain.

5. The method according to claim 1, wherein a predefined condition for creating the reincarnation block is defined as either determining whether a predefined number of blocks are appended to the block chain or determining whether a predefined timestamp value is reached.

6. The method of claim 5, wherein the predefined number of blocks is defined according to a user requirement or in accordance to a type of the blockchain.

7. The method of claim 5, wherein the predefined timestamp value is defined according to a user requirement or in accordance to a type of the blockchain.

8. The method according to claim 1, further comprising, as a preliminary step, generating the genesis block of the blockchain with:
the genesis expiry time, wherein the genesis expiry time comprises an expiry time of all the blocks succeeding the genesis block up to the first reincarnation block; and
a genesis block identifier for identifying the genesis block.

9. The method according to claim 1, wherein the first reincarnation block is the reincarnation block occurring first in sequence after the genesis block in the blockchain.

10. A computer program comprising a non-transitory computer readable medium storing computer-executable instructions for causing an apparatus to perform the method according to claim 1, when the computer-executable instructions are executed on a processor comprised in the apparatus.

11. An apparatus for creating a finite blockchain, the blockchain comprising a genesis block having a genesis expiry time, wherein the genesis block is a first block of the blockchain, the apparatus comprising:
a processor;
a computer memory storing a set of computer readable instructions that are executable by the processor, wherein the apparatus is operative to:
create a reincarnation block based on a predefined condition, append the reincarnation block to the blockchain that comprised the genesis block, wherein the reincarnation block comprises a reincarnation expiry time different than the genesis expiry time and comprises a hash value of a preceding block of the blockchain;
determine whether the genesis expiry time has elapsed based on an expiry period;
responsive to when the genesis expiry time has elapsed then identify a first reincarnation block; and
responsive to when the first reincarnation block is identified then delete all the blocks preceding the first reincarnation block including the genesis block in the block chain.

12. The apparatus of claim 11, wherein the set of computer readable instructions are further configured to identify the first reincarnation block as the genesis block.

13. The apparatus of claim 11, wherein the set of computer readable instructions are further configured to define the reincarnation block wherein the reincarnation block comprises:
a reincarnation block identifier to identify the reincarnation block, and
the reincarnation expiry time is based on an expiry time of all the blocks succeeding the reincarnation block up to a next reincarnation block.

14. The apparatus according to claim 11, wherein the set of computer readable instructions are further configured to define the expiry period wherein the expiry period is defined according to a user requirement or in accordance to a type of the blockchain.

15. The apparatus according to claim 11 wherein the set of computer readable instructions are further configured to define a predefined condition for creating the reincarnation block, wherein the predefined condition for creating the reincarnation block is defined as either to determine whether a predefined number of blocks are appended to the block chain or to determine whether a predefined timestamp value is reached.

16. The apparatus of claim 15, wherein the set of computer readable instructions are further configured to define the predefined wherein the predefined number is defined according to a user requirement or in accordance to a type of the blockchain.

17. The apparatus of claim 15, wherein the set of computer readable instructions are further configured to define the predefined timestamp value, wherein the predefined timestamp value is defined according to a user requirement or in accordance to a type of the blockchain.

18. The apparatus according to claim 11, is further operable, as a preliminary step, to generate the genesis block of the blockchain with:
a genesis expiry time, wherein the genesis expiry time comprises the expiry time of all the blocks succeeding the genesis block up to the first reincarnation block; and
a genesis block identifier to identify the genesis block.

19. The apparatus according to claim 11, wherein the first reincarnation block is the reincarnation block occurring first in sequence after the genesis block in the blockchain.

* * * * *